United States Patent
Xu et al.

(10) Patent No.: US 9,857,543 B1
(45) Date of Patent: Jan. 2, 2018

(54) BIDIRECTIONAL OPTOELECTRONIC SUB-ASSEMBLY

(71) Applicant: LumaSense Technologies Holdings, Inc., Santa Clara, CA (US)

(72) Inventors: Juncheng Xu, Santa Clara, CA (US); James Steven Chick, Santa Clara, CA (US); Terry M. Stapleton, Santa Clara, CA (US)

(73) Assignee: LumaSense Technologies Holdings, Inc., Santa Clara, CA (US)

( * ) Notice: Subject to any disclaimer, the term of this patent is extended or adjusted under 35 U.S.C. 154(b) by 0 days.

(21) Appl. No.: 15/468,908

(22) Filed: Mar. 24, 2017

(51) Int. Cl.
 G02B 6/28 (2006.01)
 G02B 6/42 (2006.01)
 G02B 6/32 (2006.01)

(52) U.S. Cl.
 CPC ............ *G02B 6/4246* (2013.01); *G02B 6/32* (2013.01); *G02B 6/4206* (2013.01); *G02B 6/428* (2013.01); *G02B 6/4214* (2013.01); *G02B 6/4251* (2013.01); *G02B 6/4277* (2013.01)

(58) Field of Classification Search
 CPC ...... G02B 6/4246; G02B 6/32; G02B 6/4206; G02B 6/4214; G02B 6/4251; G02B 6/4277; G02B 6/428
 USPC .......................................................... 385/24
 See application file for complete search history.

(56) References Cited

U.S. PATENT DOCUMENTS

| | | | | |
|---|---|---|---|---|
| 7,006,728 | B1* | 2/2006 | Jiang | G02B 6/29389 385/35 |
| 7,366,380 | B1* | 4/2008 | Peterson | G02B 6/4214 385/47 |
| 2003/0000737 | A1* | 1/2003 | Liu | B81B 7/0041 174/256 |
| 2006/0110094 | A1* | 5/2006 | Bachl | G02B 6/4246 385/14 |
| 2012/0002284 | A1* | 1/2012 | McColloch | G02B 6/4206 359/558 |
| 2013/0229707 | A1* | 9/2013 | Sakaguchi | G02B 21/18 359/372 |
| 2014/0363691 | A1* | 12/2014 | Hundley, Jr. | C09D 5/004 428/537.1 |

* cited by examiner

Primary Examiner — Jerry Blevins
(74) *Attorney, Agent, or Firm* — Osha Liang LLP

(57) ABSTRACT

A bidirectional optoelectronic sub-assembly. The bidirectional optoelectronic sub-assembly includes an assembly body. The assembly body is configured to interface a light source, a photodetector, an optical waveguide, coupling optics and a beam splitter in optical alignment. The assembly body includes a light source port configured to accommodate the light source, an optical port configured to interface with an optical connector of the optical waveguide, a beam splitter slot configured to accommodate the beam splitter on a first optical path between the light source and the optical waveguide, and on a second optical path between the optical waveguide and the photodetector, and a faraday cage cavity configured to accommodate the photodetector.

18 Claims, 4 Drawing Sheets

BIDIRECTIONAL OPTOELECTRONIC SUB-ASSEMBLY

BACKGROUND

Optical signal transmission may be used in various applications including, for example, measurement and communication applications. These applications may require the transmission of different optical signals in different directions. Bidirectional optical sub-assemblies (BOSAs) may be used to guide, separate and/or combine these different optical signals.

SUMMARY

In general, in one aspect, the invention relates to a bidirectional optoelectronic sub-assembly. The bidirectional optoelectronic sub-assembly includes an assembly body configured to interface a light source, a photodetector, an optical waveguide, coupling optics and a beam splitter in optical alignment. The assembly body includes a light source port configured to accommodate the light source, an optical port configured to interface with an optical connector of the optical waveguide, a beam splitter slot configured to accommodate the beam splitter on a first optical path between the light source and the optical waveguide, and on a second optical path between the optical waveguide and the photodetector, and a faraday cage cavity configured to accommodate the photodetector.

DETAILED DESCRIPTION

Figure 1:
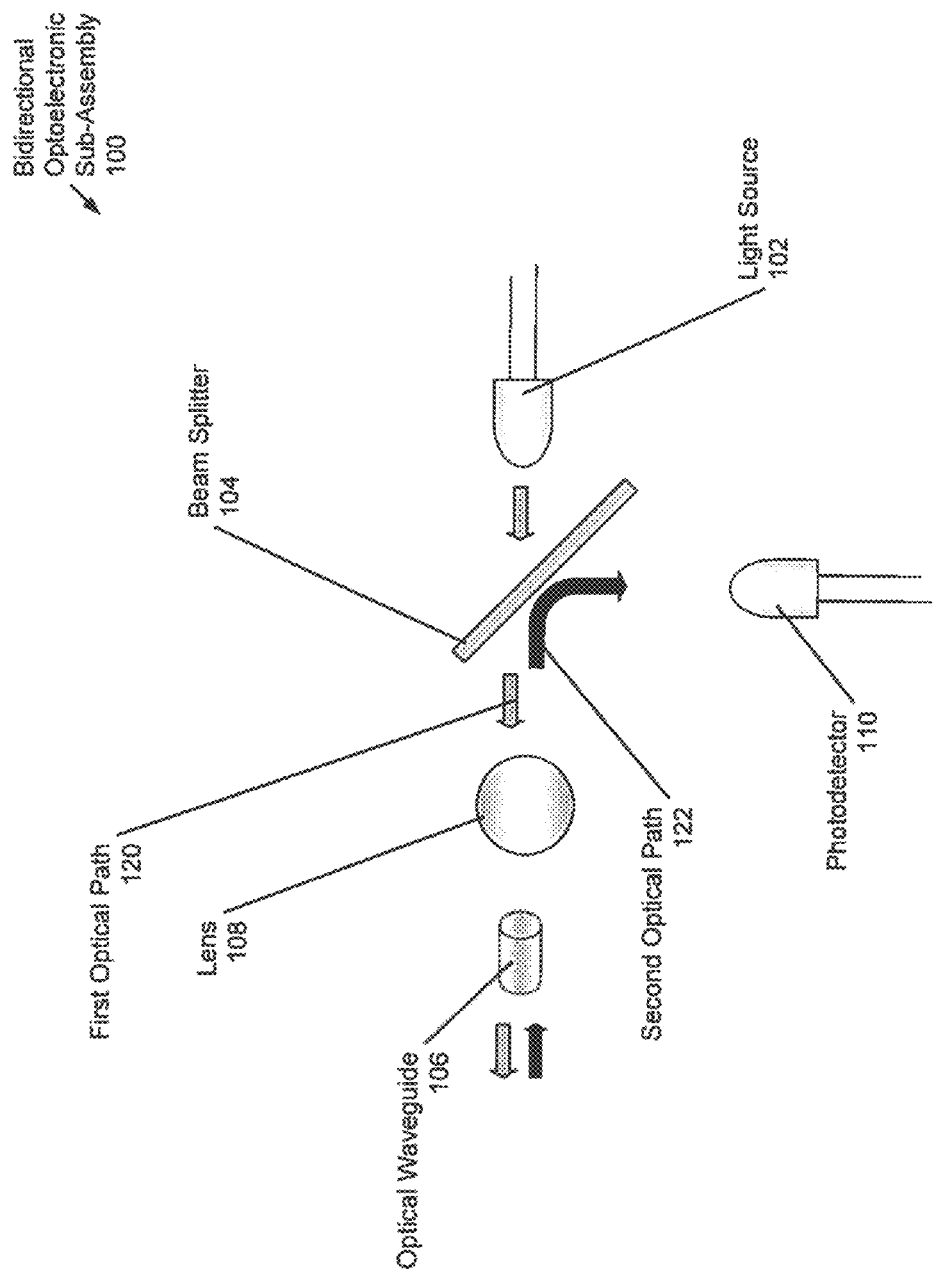
FIG. 1 schematically shows a bidirectional optoelectronic sub-assembly (BOSA) in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-2C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to bidirectional optical sub-assemblies (BOSAs). BOSAs may be used to guide, separate and/or combine different optical signals, as subsequently described. BOSAs establish optical paths between different optical components. In order to successfully transmit light via the BOSA, alignment of these optical components with the BOSA may be critical, for example, to minimize losses and to maximize signal transmission quality. In one or more embodiments of the invention, the BOSA is configured to establish alignment of the optical components of the BOSA and/or the optical components that interface with the BOSA, as the BOSA is assembled.

FIG. 1 schematically shows an exemplary BOSA (100) in accordance with one or more embodiments of the invention. The BOSA includes a light source (102), a beam splitter (104), an optical waveguide (106), a lens (108) and a photodetector (110). Each of these components is subsequently described.

The exemplary BOSA (100) receives light from a light source (102) and directs the light to the optical waveguide (106), through the beam splitter (104) (gray arrows, indicating the first optical path (120)). Further, the exemplary BOSA also receives light from the optical waveguide. The light received from the optical waveguide is directed to the photodetector (110) via the beam splitter (104) (black arrows, indicating the second optical path (122)). Accordingly, the optical paths (120, 122) provided by the BOSA for the light received from the light source and for the light received from the optical waveguide are different. These different paths, in one or more embodiments of the invention, are a result of the beam splitter (104) being transparent for the light received from the light source (first optical path (120)), and being reflective for the light from the optical waveguide (second optical path (122)), as discussed in detail below. The exemplary BOSA (100) may be used, for example, in a measurement application where an excitation light, provided by the light source, is directed to a component to be measured, via the optical waveguide. Light returned from the component to be measured is directed to the photodetector, which may be used to assess the returned light signal to obtain a measurement. Other applications of the BOSA include communication applications and any other applications that require two-way transmission of light.

The light source (102) may be any type of light source that emits visible and/or invisible light. The light source may be, for example, an LED, a laser, or an incandescent, fluorescent or high-intensity discharge light bulb. At least some of the emitted light is directed to the beam splitter (104). The light emitted by the light source may be focused in a beam (e.g., if the light source is a laser, or using additional optical elements not shown in FIG. 1). In one embodiment of the invention, the light source (102) emits light with specific characteristics. The characteristics include an emission spectrum limited to a particular wavelength or range of wavelengths, and/or a particular polarization of the emitted light. These characteristics may be specific to the light source (102) itself, or they may be obtained using an additional filter (not shown), such as a polarization filter.

The beam splitter (104), in one or more embodiments of the invention, is the element of the BOSA that establishes separate optical paths (120, 122) based on differing characteristics of the light emitted by the light source (102) and the light received from the optical waveguide (106). The beam splitter (104) may be, for example, wave-length-specific or polarization-specific, thus being transparent for light with one characteristic and being reflective for light with another characteristic. In one or more embodiments of the invention, the beam splitter is plate-shaped, with one surface of the plate facing the light source, and the other surface of the plate facing the optical waveguide and the photodetector. The plate may be oriented at an angle of for example, 45° relative to the light source (102), the optical waveguide (106) and the photodetector (110), as illustrated in FIG. 1. The plate may be coated with, for example, a metallic coating and/or a dichroic coating to obtain the wavelength-specific characteristics of the beam splitter (104).

The optical waveguide (106), in accordance with one or more embodiments of the invention, transmits light in two directions. The optical waveguide transmits light emitted by the light source (102) (first optical path, (120)) in a direction away from the BOSA. The optical waveguide further transmits light toward the photodetector (110) (second optical path, (122)) via the BOSA. The optical waveguide may be of any geometry (e.g., planar, strip, or fiber), mode structure (i.e., single-mode or multi-mode), refractive index distribution (i.e., step or gradient index) and material (e.g., glass, polymer, semiconductor, etc.).

For example, in a scenario on which the optical waveguide (106) is an optical fiber, the optical fiber may be made of optical glass or plastic and may include a transparent core, surrounded by a transparent cladding material with a lower index of refraction, thus keeping light in the core, and making the fiber act as a waveguide. The lens (108), in accordance with one or more embodiments of the invention, is used to form coupling optics that improve the signal coupling between the optical waveguide (106) and the other optical components of the BOSA (100). The lens (108) may be, for example, a ball lens. The lens (108) may focus light on the fiber end of the optical fiber, as further illustrated in FIG. 2B. The lens (108) may thus reduce the amount of non-focused light that strikes regions surrounding the fiber end rather than the fiber end itself.

The photodetector (110), in accordance with one or more embodiments of the invention, receives light on the second optical path (122) of the BOSA. The photodetector may be a photodiode, a phototransistor, a photoresistor, a charge-coupled device (CCD) image sensor a CMOS image sensor, a photochemical transducer or any other component that is photosensitive. If a photodetector that produces an electrical output signal is used, the photodetector may interface with signal conditioning circuits such as amplifiers, filters, analog-to-digital converters, etc.

Precise alignment of the above-described components may be important or at least beneficial in order to establish low-loss, high reliability first and second optical paths (120, 122) via the BOSA (100). An assembly body, subsequently described with reference to FIGS. 2A-2C, in accordance with an embodiment of the invention, may be used to interface and align above-described components.

Those skilled in the art will recognize that a BOSA in accordance with one or more embodiments of the invention is not limited to the exemplary configuration schematically illustrated in FIG. 1. For example, the signaling directions (gray and black arrows) may deviate from those illustrated, without departing from the invention. Further, although FIG. 1 shows an optical fiber interfacing with the BOSA, those skilled in the art will appreciate that instead, any other optical element may be configured to interface with the BOSA. Further, the locations of the light source (102) and the photodetector (110) may be switched, without departing from the invention.

Figure 2A:
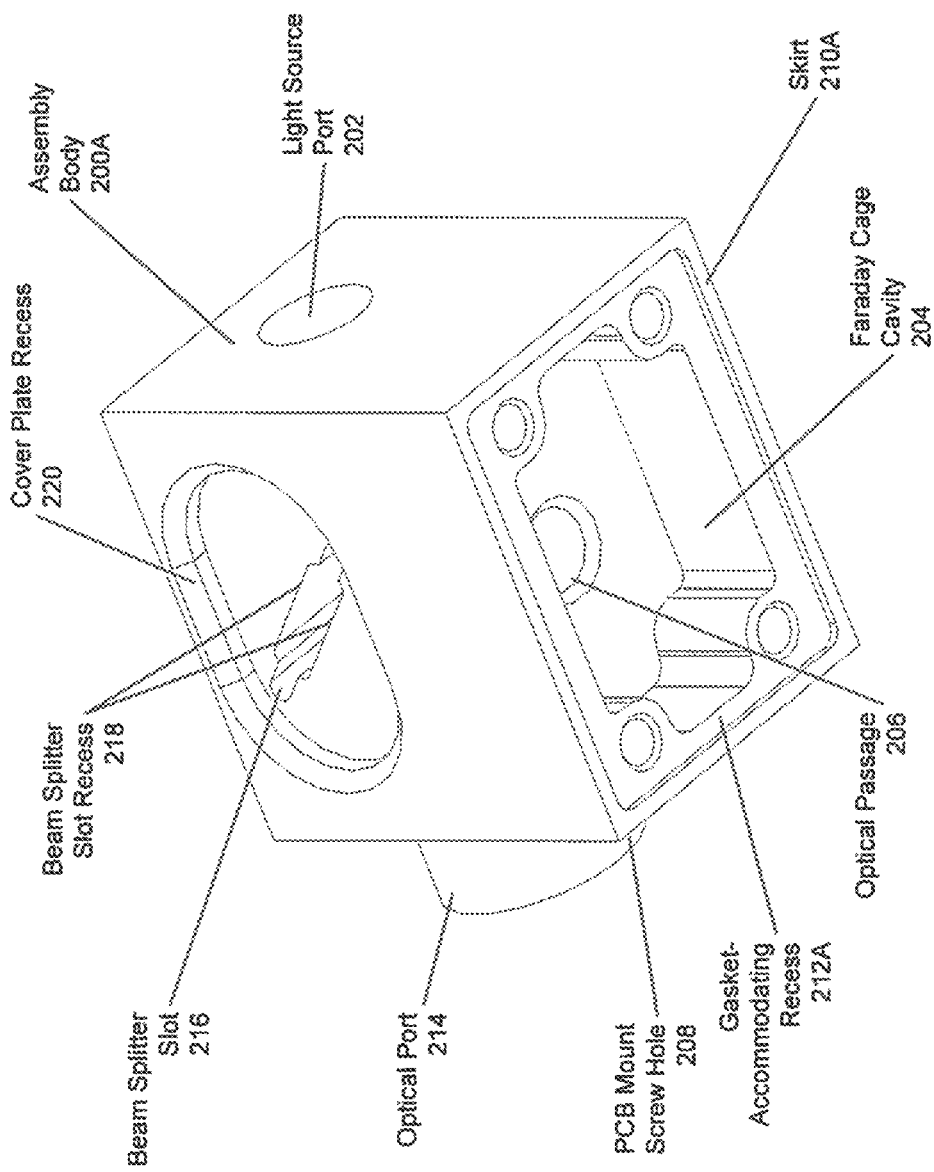
FIG. 2A shows a perspective view of an assembly body of a BOSA in accordance with one or more embodiments of the invention.

FIG. 2A shows a perspective view of an assembly body of a BOSA, in accordance with one or more embodiments of the invention. The assembly body (200A), in accordance with one or more embodiments of the invention includes features that enable the assembly body to establish alignment between the optical components on the first and the second optical paths, and further to protect one or more of these components from environmental influences such as dust, moisture, electromagnetic interference (EMI), etc.

In one embodiment of the invention, the assembly body (200A) is a substantially cuboid-shaped block. The assembly body is configured to accommodate and/or to interface with the light source (102), the beam splitter (104), the optical fiber (106) and the photodetector (110), as subsequently described.

In one embodiment of the invention, the assembly body includes a port (202) configured to accommodate the light source (102). The geometry and the dimensions of the light source port are chosen such that the light source is aligned on the first optical path, as further described below with reference to FIG. 2B. The port (202) may be, for example, a cylindrical counterbored hole.

Figure 2B:
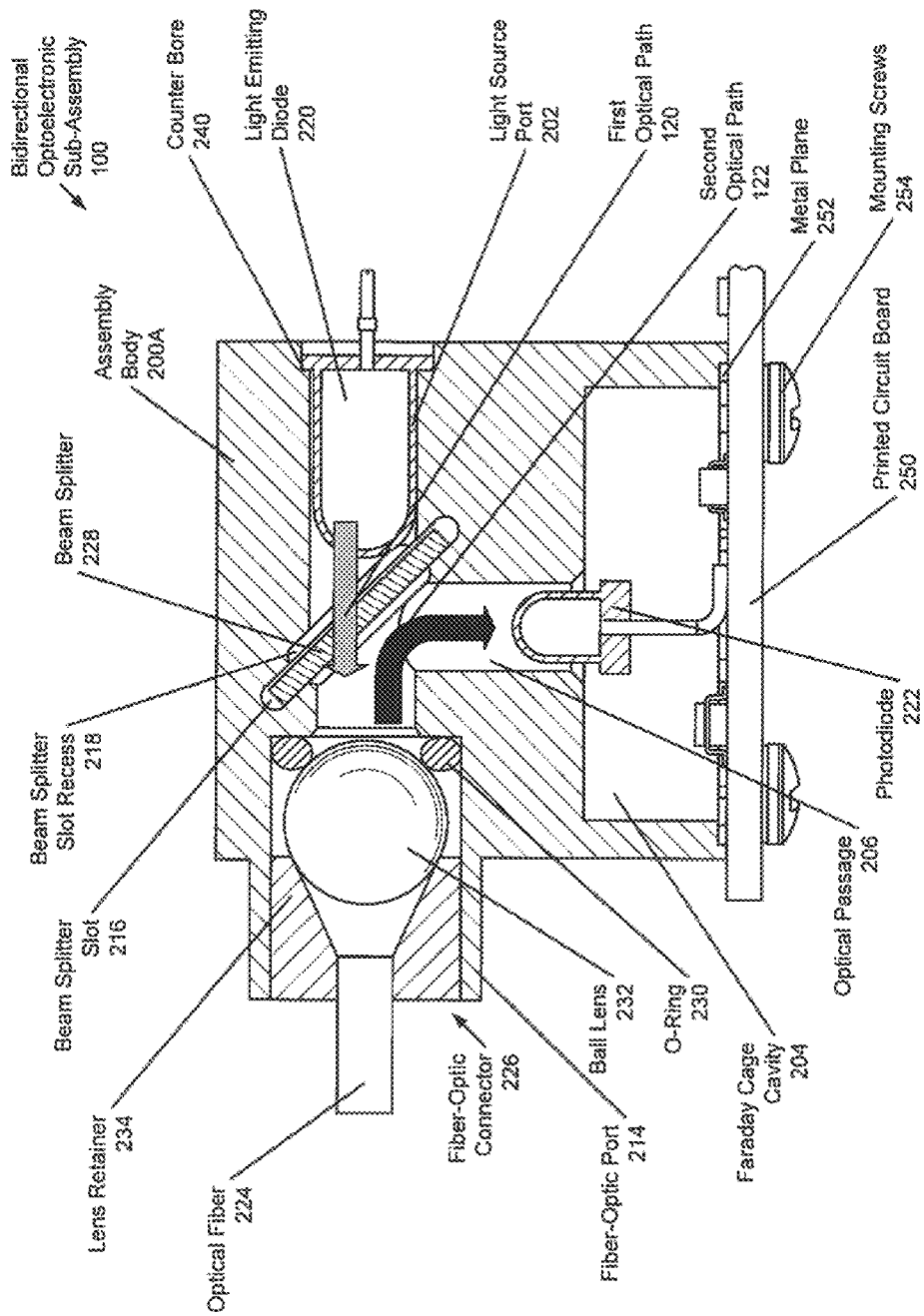
FIG. 2B shows a cross-sectional view of the assembly body of FIG. 2A in accordance with one or more embodiments of the invention.

In one embodiment of the invention, the assembly body further includes an optical port (214), configured to interface with an optical connector of the optical waveguide (106). In the exemplary embodiment of FIG. 2A, the optical waveguide is an optical fiber, and accordingly the optical port is a fiber-optic port and the optical connector is a fiber-optic connector The geometry and the dimensions of the fiber-optic port are chosen to be compatible with the fiber-optic connector of the optical fiber, as further described below with reference to FIG. 2B. The fiber-optic port may include, for example a cylindrical extension protruding from the assembly body, as illustrated in FIG. 2A. The fiber-optic port may further include a cylindrical hole, concentric to the fiber optic port and the cylindrical counterbored hole of the light source port (202). The cylindrical hole may connect the light source port (202) with the fiber-optic port (214), thereby establishing a straight optical passage that forms the first optical path (120), as illustrated in FIG. 2B.

In one embodiment of the invention, the assembly body also includes a faraday cage cavity (204). The faraday cage cavity may be a recess in the assembly body (200A), configured to accommodate the photodetector. The assembly body may be mounted on a printed circuit board (PCB), (250), as subsequently discussed, and the faraday cage cavity may generate a space on the surface of the PCB, configured to accommodate the photodetector (110) protruding from the surface of the PCB, as further illustrated in FIGS. 2B and 2C. The faraday cage cavity (204), in accordance with an embodiment of the invention provides shielding from electromagnetic interference (EMI) by forming a metal or metalized enclosure surrounding the components that are housed in the faraday cage cavity. The components may include electronics that may be EMI sensitive, including, for example, signal conditioning circuits that receive and condition signals from the photodetector. To provide EMI protection, the walls of the faraday cage cavity (204) are in electrical contact with a metal plane (252) of the PCB (250), as shown in FIG. 2B. In combination, the metal plane and the walls of the faraday cage cavity thus delimit a, for example, substantially cuboid-shaped volume, i.e., the faraday cage cavity, thus forming a complete or near-complete EMI shielding enclosure of the components in the faraday cage cavity. The metal plane (252) may be, for example, a copper layer on the top or bottom surface of the PCB (250), or it may be an intermediate layer anywhere in the PCB (250). In one embodiment of the invention, the metal plane (252) has a footprint that is identical to the footprint of the assembly body (200A), or alternatively extends beyond the borders of the assembly body.

An optical passage (206) may be established between the faraday cage cavity (204) and the straight optical passage between the light source port (202) and the fiber-optic port (214). This optical passage (206) may be a cylindrical hole, substantially perpendicular to the straight optical passage, thus forming the second optical path between the fiber-optic port and the photodetector. Additional details regarding the optical passages are provided below, with reference to FIG. 2B.

In one embodiment of the invention, the base of the assembly body (200A) includes a skirt (210A) that surrounds the faraday cage cavity (204). The skirt (210A) is configured to be in direct electrical contact with the PCB, thus establishing a conductive path between the surface of the PCB and the assembly body to provide EMI shielding to the components housed in the faraday cage cavity, upon installation of the assembly body (200A) on the PCB. Within the perimeter of the skirt, a gasket accommodating recess (212A) provides space to insert a gasket (e.g. a rubber or silicone gasket) configured to provide environmental protection of the components in the faraday cage cavity. As the assembly body is mounted on the surface of the PCB, the gasket may be compressed until the skirt (210A) comes in contact with the surface of the PCB, thus forming an airtight and/or light-tight seal and a fixed compression-stop to avoid over-compression of the gasket and potential material creep which can result in unstable BOSA mounting integrity. With the skirt (210) being in contact with a metal surface of the PCB, good EMI shielding of the components housed in the faraday cage cavity may be achieved.

While the exemplary assembly body (200A), shown in FIG. 2A, is equipped with screw holes (208) to enable installation of the assembly body on the surface of the PCB using mounting screws (254), alternative components may be used to mechanically secure the assembly body on the surface of the PCB, including, but not limited to hooks, clips bolts, rivets, etc. In one embodiment of the invention, the mounting screws (254) or other alternatively used mounting components establish an electrical contact between the metal plane (252) and the assembly body (200A), thus establishing complete or near-complete EMI shielding of the components in the faraday cage cavity (204).

In one embodiment of the invention, the assembly body (200A) further includes a beam splitter slot (216), configured to allow insertion of the plate-shaped beam splitter (104) into the assembly body. The beam splitter slot (216) traverses the assembly body (200A) perpendicular to and intersecting with the first and the second optical paths (120, 122). Further, the beam splitter slot may be oriented at a 45° angle to obtain the 90° deflection of the second optical path (122), as illustrated in FIG. 1. The width of the beam splitter slot (216) may be selected based on the thickness of the beam splitter plate. For example, the width of the beam splitter slot may be selected such that the beam splitter plate is tightly held in the beam splitter slot, when inserted. A beam splitter slot manufactured in this manner may ensure that correct optical alignment of the beam splitter (104) is automatically accomplished upon insertion into the beam splitter slot (216).

In one embodiment of the invention, the beam splitter slot (216) is equipped with central recesses (218). These recesses are positioned such that they allow insertion of the beam splitter (104) without making contact with the beam splitter slot (216) in the central area to avoid scratching of the beam splitter (104) in the region where the optical paths intersect with the beam splitter.

The beam splitter slot (216), on the surface of the assembly body (200A), may be surrounded by a cover plate recess (220). The cover plate recess, in accordance with an embodiment of the invention, is configured to accommodate a cover plate, after insertion of the beam splitter into the beam splitter slot. The cover plate may be fixated in the cover plate recess using an adhesive such as silicone, epoxy, etc., thus establishing an airtight seal to prevent contamination of the beam splitter, e.g., with dust. If the beam splitter slot recess traverses the entire assembly body (200A), a similar cover plate recess (220) for the installation of another cover plate may be positioned on the opposite side (not shown) of the assembly body (200A).

FIG. 2B shows a cross-sectional view of the assembly body (200A) of FIG. 2A. The cross-sectional view discloses details, e.g., internal structural details of the assembly body (200A) that are not visible in the perspective view of FIG. 2A.

Turning to FIG. 2B, the assembly body (200A) is shown with a beam splitter (104), a light source (102), a photodetector (110) and an optical fiber (106) installed. In the exemplary embodiment shown in FIG. 2B, the light source is a light emitting diode (LED) (220). Further, the photodetector is a photodiode (222).

As illustrated in FIG. 2B, the LED (220) is tightly accommodated by the light source port (202). More specifically, the insertion depth of the LED (220) is limited by the depth of the light source port (202). Further, the counter bore (240) provides lateral guidance of the LED (220), thus establishing alignment of the LED on the first optical path (120). An adhesive or sealant such as epoxy or silicone may be used to permanently secure the LED in the light source port and/or to generate an airtight seal.

While this is not shown in FIG. 2B, alignment of the photodiode (222) may optionally be accomplished by a design similar to the light source port. For example, the optical passage (206) may be equipped with a counter bore to establish alignment of photodiode (222) on the second optical path (122).

FIG. 2B further shows details of the interface between the assembly body (200A) and the optical fiber (224). More specifically, this interface includes a fiber-optic connector (226), a ball lens (232), an O-ring (230) and a lens retainer (234). In one embodiment of the invention, the fiber-optic connector (226) is attached to the end of the optical fiber (224)

The fiber-optic connector (226), in accordance with one or more embodiments of the invention, may interface the optical fiber (224) with the assembly body (200A) in alignment with the first and the second optical paths (120, 122). The alignment may be established by the mechanical interface between the fiber-optic port (214) and the fiber-optic connector (226), as illustrated in FIG. 2B. The interface between the fiber-optic port (214) and the fiber-optic connector (226) may or may not include a coupling mechanism such as threads, a latch clip, a bayonet-style nut, or any other device suitable for mechanically securing the fiber-optic connector. Additionally or alternatively an adhesive or sealant such as epoxy or silicone may be used to permanently secure the fiber-optic connector on the fiber-optic port, and/or to generate an airtight seal.

As previously noted, the fiber-optic connector (226) includes a lens retainer (234), further illustrated in FIG. 2B. The lens retainer may be a tapered structure configured to hold the ball lens (232). As the fiber-optic connector (226) is fully inserted into the fiber-optic port (226), the ball lens (232) may be pressed against the O-ring (230), thus locating the ball lens in a position as needed to establish optical coupling of the optical fiber with the first and the second optical paths (120, 122). The lens retainer (234) may further also function as a ferrule. The ferrule may hold the optical fiber (224), may align the fiber and may position the fiber end of the optical fiber at a location suitable to obtain good optical coupling via the ball lens (232). Alternatively, the ferrule may be a component separate from the lens retainer.

Figure 2C:
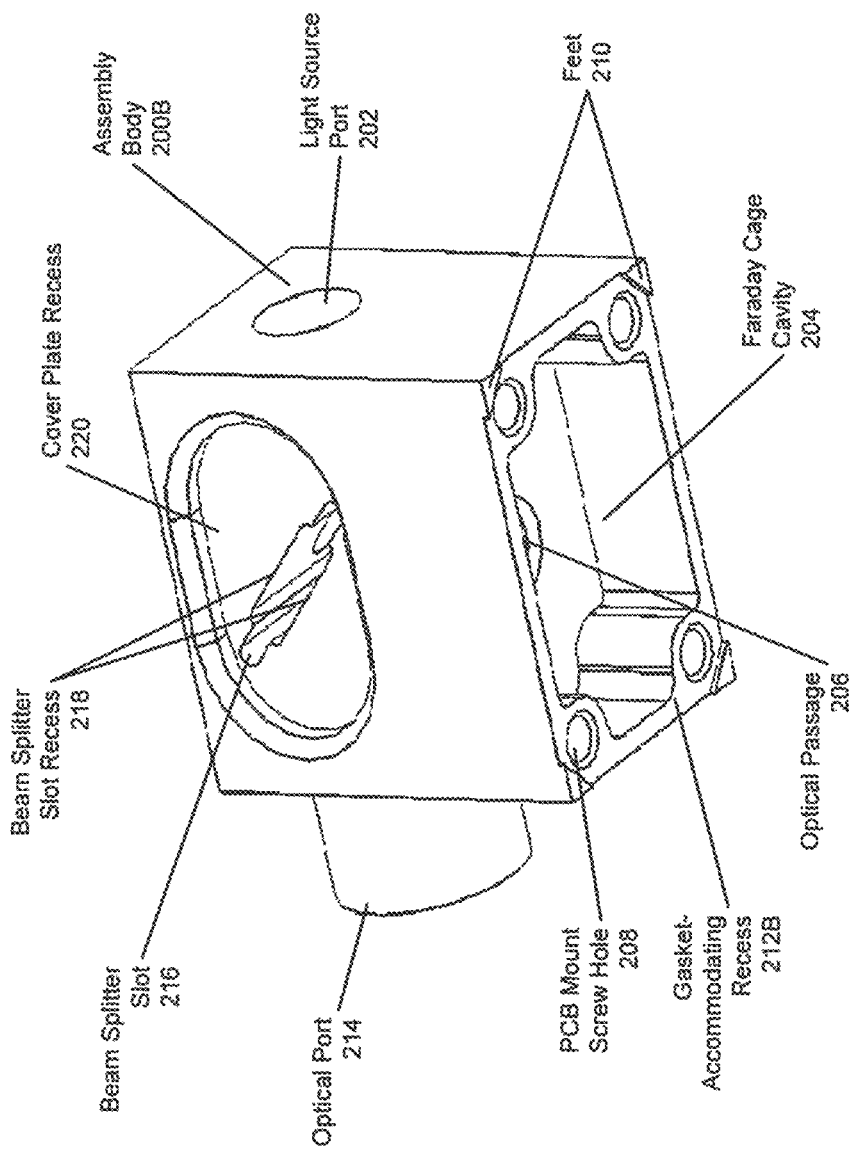
FIG. 2C shows a perspective view of an assembly body of a BOSA in accordance with one or more embodiments of the invention.

FIG. 2C shows a perspective view of an assembly body of a BOSA, in accordance with one or more embodiments of the invention. The assembly body (200B), is similar to the assembly body (200A), with the exception of the interface to the printed circuit board (PCB). More specifically, the base of the assembly body (200B) includes feet (210B), e.g., four feet placed at the corners of the assembly body, at the periphery of the faraday cage cavity (204). The feet (210B) are configured to be in direct electrical contact with the PCB, thus establishing a conductive path between the surface of the PCB and the assembly body, to provide EMI shielding to the components housed in the faraday cage cavity. A gasket accommodating recess (212B) provides space to insert a gasket (e.g. a rubber or silicone gasket) configured to provide environmental protection of the components in the faraday cage cavity. As the assembly body is mounted on the surface of the PCB, the gasket may be compressed until the feet (210B) come in contact with the surface of the PCB, thus forming an airtight and/or light-tight seal and a fixed compression-stop to avoid over-compression of the gasket and potential material creep which can result in unstable BOSA mounting integrity. As the gasket is visible at the edges of the assembly body (200B), the quality of the seal may be inspected after installation of the assembly body on the PCB.

In one or more embodiments of the invention, the assembly body (200A, 200B) is a metal body. Ferrous metals, aluminum, copper or other metallic materials may be used, for example. Alternatively, nonmetallic materials including plastic and ceramic materials may be used. If an electrically non-conductive material is used, at least the faraday cage cavity may be metalized in order to provide EMI shielding.

Embodiments of the invention may enable BOSAs that allow bidirectional use of an optical fiber. BOSAs in accordance with an embodiment of the invention are equally suitable for the transmission of digital and analog signals. The components of the BOSA are self-aligning, thus facilitating the assembly of the BOSA and increasing the quality of the signal transmission, in particular by reducing the loss of light at the interface with the optical fiber. Further, the BOSA requires only a single assembly body, thus eliminating inaccuracies that may result from the assembling of multiple components, increasing robustness and reducing cost. BOSAs in accordance with an embodiment of the invention further include EMI shielding of electronic components that are housed in the faraday cage cavity, thus making the BOSA particularly suitable for highly noise sensitive applications and/or noisy environments. BOSAs in accordance with an embodiment of the invention are further also sealed with controlled and fixed compression of the sealant against environmental effects such as dust, moisture and/or ambient light.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A bidirectional optoelectronic sub-assembly comprising:
  an assembly body configured to interface a light source, a photodetector, an optical waveguide, coupling optics and a beam splitter in optical alignment, the assembly body comprising:
    a beam splitter slot configured to accommodate the beam splitter on a first optical path between the light source and the optical waveguide, and on a second optical path between the optical waveguide and the photodetector;
    a first bore that traverses the assembly body in a first direction;
    a light source port disposed at a first end of the first bore, on the first optical path, and configured to accommodate the light source;
    an optical port disposed at a second end of the first bore on the first and the second optical paths, and configured to interface with an optical connector of the optical waveguide; and
    a faraday cage cavity configured to accommodate the photodetector.

2. The bidirectional optoelectronic sub-assembly of claim 1, wherein a second bore in a second direction, perpendicular to the first direction, intersects with the first bore, at the intersection of the first bore with the beam splitter slot, and extends to the photodetector in the faraday cage cavity.

3. The bidirectional optoelectronic sub-assembly of claim 2,
  wherein the beam splitter slot traverses the assembly body in a third direction, perpendicular to the first and second directions and intersecting with the first and the second bores.

4. The bidirectional optoelectronic sub-assembly of claim 1, wherein the beam splitter slot comprises recesses configured to prevent scratching of the beam splitter in the region of optical path.

5. The bidirectional optoelectronic sub-assembly of claim 1, further comprising a beam splitter cover plate configured to cover the beam splitter slot.

6. The bidirectional optoelectronic sub-assembly of claim 5, wherein the beam splitter cover plate is disposed in a cover plate recess of the assembly body.

7. The bidirectional optoelectronic sub-assembly of claim 1, further comprising a lens configured to establish an optical coupling of the optical waveguide into the optical paths.

8. The bidirectional optoelectronic sub-assembly of claim 7, further comprising an O-ring disposed in the optical port, configured to support the lens.

9. The bidirectional optoelectronic sub-assembly of claim 8, further comprising the optical connector, the optical connector comprising a lens retainer configured to establish a position of the lens on the optical path, in conjunction with the O-ring.

10. The bidirectional optoelectronic sub-assembly of claim 1,
wherein the assembly body is mounted on a surface of a printed circuit board, with the faraday cage cavity facing the surface of the printed circuit board,
wherein the faraday cage cavity is surrounded by a skirt configured to be entirely in direct contact with an electrically conductive region on the surface of the printed circuit board, and
wherein a gasket disposed within the boundaries of the skirt hermetically seals the faraday cage cavity.

11. The bidirectional optoelectronic sub-assembly of claim 1,
wherein the assembly body is mounted on a surface of a printed circuit board, with the faraday cage cavity facing the surface of the printed circuit board,
wherein feet at the periphery of the faraday cage cavity are in direct contact with an electrically conductive region on the surface of the printed circuit board, and
wherein a gasket is disposed in the region surrounding the feet to hermetically seal the faraday cage cavity.

12. The bidirectional optoelectronic sub-assembly of claim 1, further comprising:
the light source;
the photodetector;
the coupling optics;
the optical connector, including the optical waveguide; and
the beam splitter.

13. The bidirectional optoelectronic sub-assembly of claim 12, wherein the optical paths are hermetically sealed from the environment surrounding the bidirectional optoelectronic sub-assembly.

14. The bidirectional optoelectronic sub-assembly of claim 12, wherein the light source is one selected from a group consisting of a light emitting diode and a laser.

15. The bidirectional optoelectronic sub-assembly of claim 12, wherein the beam splitter is a semi-reflective plate that is one selected from a group consisting of wavelength-specific and polarization-specific.

16. The bidirectional optoelectronic sub-assembly of claim 12, wherein the photodetector is one selected from a group consisting of a photoresistor, a photodiode and a phototransistor.

17. The bidirectional optoelectronic sub-assembly of claim 1, wherein the assembly body is made from one selected from a group consisting of a metal, a metalized plastic material and conductive ceramics.

18. The bidirectional optoelectronic sub-assembly of claim 1, wherein the faraday cage cavity is further configured to accommodate sensitive electronics.

\* \* \* \* \*